United States Patent Office 3,600,344
Patented Aug. 17, 1971

3,600,344
HYDROPHYLIC AIR DRYING SYNTHETIC RESINS THAT ARE USEFUL AS BINDERS IN WATER-DILUTABLE LACQUERS AND THEIR METHOD OF PREPARATION WITH BORON AND ITS OXYGEN CONTAINING COMPOUNDS
Bernhard Broecker and Hans-Joachim Kiessling, Hamburg, Germany, assignors to Reichhold-Albert-Chemie Aktiengesellschaft, Hambury, Germany
No Drawing. Filed Feb. 4, 1969, Ser. No. 796,604
Claims priority, application Switzerland, Feb. 5, 1968, 1,742/68
Int. Cl. C08g 37/18
U.S. Cl. 260—19     4 Claims

ABSTRACT OF THE DISCLOSURE

Water-soluble air drying synthetic resins from drying and/or semi-drying oils comprising:
(a) fatty acid free condensation products of fatty acids, wherein fatty acid which is free of hydroxyl groups and is at least partially unsaturated and has at least 6 carbon atoms, which contain a predominant amount of such fatty acids free of hydroxyl groups or monoketones derived therefrom, is condensed in the presence of a small quantity of boron or of its oxygen-containing compounds as a condensation catalyst to a temperature of between about 230–330° C. with azeotropic removal of the resulting water of reaction and return of the evaporated fatty acids, with the condensation product containing at least 40% of unsaponifiable matter having a mean molecular weight corresponding to the calculated molecular weight of a condensation product of at least 3 molecules of the corresponding fatty acids and the unreacted fatty acids are substantially separated off from the reaction mixture by extraction or distillation;
(b) reacting by heating with such quantities of $\alpha,\beta$-ethylenically unsaturated monocarboxylic and/or polycarboxylic acids and to the extent they exist, their anhydrides;
(c) optionally in the presence of other vinyl or vinylidene compounds;
(d) the reaction products having an acid number of at least 35; and
(e) neutralized at temperatures of below 50° C. with such quantities of ammonia and/or strong nitrogen bases that the reaction products are adequately capable of dispersion in water or dilution with water.

CROSS-REFERENCES TO RELATED APPLICATIONS

The disclosure of U.S. application Ser. No. 728,920, (now abandoned) filed May 14, 1968 and having the same assignee as the present application is incorporated herein. This copending application is entitled "Process for the Production of Flm-Forming Synthetic Resins and Coating Compositions Based on Such Resins," and the inventor is Rolf Güldepfennig.

BACKGROUND OF THE INVENTION

The field of the invention is coating composition containing fat, fatty oil, fatty oil acid or salts thereof.
The state of the prior art is set forth in Kirk-Othmer, "Encyclopedia of Chemical Technology," 2nd ed., vol. 1 (1963) under the section entitled "Alkyd Resins," pages 851–882; vol. 3 (1964), under the sections "Boron and Boron Alloys," "Boron Oxides, Boric Acid and Borates" and "Boric Acid Esters," on pages 602–673; vol. 8 (1965), in the section entitled "Electrophoretic Deposition," pages 23–36; and vol. 15 (1968), in the section entitled "Phenolic Resins," pages 176–207. U.S. Pat. 2,923,718 of Mikusch-Buckberg issued Feb. 2, 1960 and Canadian Pat. 587,582, issued Nov. 24, 1959, disclosed the prior art condensation of fatty acids in the presence of boron or oxygen containing boron compounds.

The reaction of (a) with (b) is diclosed in the text book of H. Wagner and H. F. Sark, entitled "Lackkunstharze 1959 (Synthetic Resins for Lacquers 1959)," published by Karl Hanser-Verlag, beginning at page 87. Suitable pigments useful with the lacquers of the present invention are disclosed in the German Color Journal "Deutsche Farbenseitschrift" of S. Holsinger, vol. 19, page 401 (1965), and the book of G. H. Ott and D. Dreher, "Schweizer Archiv für angewandte Wissenschaft und Technik (Swiss Archives for Applied Science and Technology)," vol. 31, No. 6, page 189 (1965).

SUMMARY OF THE INVENTION

This invention relates to a process for the preparation of air drying synthetic resins and it also includes coating compositions based on such resins. The invention is particularly concerned with the preparation of air drying synthetic resins and with coating compositions utilizing such resins which are dilutable with water.

In recent years oil-modified polyester resins have been developed which are soluble in water and which may be used as resin binders for air drying paints. Such polyester resins suffer from the great disadvantage, however, that they exhibit inadequate storage stability in aqueous alkaline solutions, as a result of which water-insoluble constituents slowly form on storage.

According to the present invention, there is provided a process for the preparation of an air drying synthetic resin which comprises heating an unsaturated fatty acid condensation product, as hereinafter defined, with an $\alpha,\beta$-ethylenically unsaturated mono- or polycarboxylic acid or anhydride under such conditions and in such relative proportions that the reaction product has an acid number of at least 35.

By the term "unsaturated fatty acid condensation product" is meant essentially fatty acid-free condensation products obtained by heating a mixture of fatty acids at least some of which contain at least 6 carbon atoms and are ethylenically unsaturated in the presence of a condensation catalyst such as boron or one of its oxygen containing compounds at a temperature of between 220 and 330° C. The fatty acid reactants should contain no more than a minor amount of fatty acids containing hydroxyl groups or monoketones derived therefrom. In carrying out the condensation reaction, the water of reaction should be removed azeotropically and volatile fatty acids recycled to the reaction vessel. The reaction should be carried out in such a way that the condensation product contains at least 40% of unsaponifiable material having a mean molecular weight corresponding to the calculated molecular weight of a condensation product of at least 3 molecules of the original monomeric fatty acids.

If desired, particularly where $\alpha,\beta$-unsaturated moncarboxylic acids are reacted with the unsaturated fatty acid condensation product, one or more other vinyl or vinylidene compounds may be included in the reaction mixture.

The air drying synthetic resins obtained in accordance with the process of the invention may be rendered soluble in water by reaction with ammonia or other strong nitrogen base to form the corresponding salts. The formation of the salts should be carried out at temperatures below 50° C.

The unsaturated fatty acid condensation products may be obtained, for example, by condensation of the following acids: elaeostearic acid, licanic acid, parinaric acid, linoleic acid with isolated and conjugated double bonds or other fatty acids having 10 to 30 carbon atoms which possess at least one ethylenically unsaturated double bond in the chain, such as for example petroselinic acid, oleic acid, elaidic acid, erucic acid, arachidonic acid, or elupanodenic acid. Preferably, unsaturated fatty acid condensation products are used in which the fatty acids used in the condensation reaction are unsaturated fatty acid mixtures such as are obtained from natural, vegetable and animal, unsaturated oils or fats by saponification. Such natural unsaturated oils or fats are, for example, cottonseed oil, lupin oil, corn oil, rape oil, sesame oil, grapenut oil, walnut oil, perilla oil, linseed oil, wood oil and oiticica oil. Furthermore, such acids as dehydrated castor oil fatty acids, which contain a high proportion of conjugated linoleic acid, are suitable as fatty acids for the manufacture of the condensation products used as the starting material. Preferably, fatty acids having iodine numbers of above 120 are employed for the manufacture of these condensation products.

The fatty acid condensation can be directed respectively, so that the viscosity of the fatty acid condensation products can vary extensively at the finish. The viscosities of the fatty acid condensation products suitable for the products of this invention lie between 20 and 90 p., preferably between 30 and 60 p. In order to obtain lower viscosities, the reaction should be so guided—in particular on the addition of fatty acid mixtures with an iodine number over 160—that it is interrupted after a relatively short period of time, e.g. when about 70–80% of the fatty acid mixture has been condensed. The remaining unreacted fatty acid must then be removed by vacuum distillation. The reaction period can be lengthened with fatty acid mixtures of an iodine number under 160; the reaction can be carried out until about 80–95% of the fatty acids have reacted, without the final viscosity of the fatty acid condensation products being too high.

The boron or preferably oxygen-containing boron compound catalysts of U.S. Pat. 2,923,718 of Mijusch-Buchberg are useful in the processes of the present invention.

Preferred inorganic boron compounds are boric acid and boric oxide. Boron salts, such as, for example, the alkali pentaborates, preferably ammonium pentaborate, may also be used with advantage. Borax, however, has only a slight activity as a catalyst. Boron compounds with oxidizing properties are not preferred.

Preferred organic boron compounds are the esters of boric acid, such as boric acid trimethyl ester, boric acid triethyl ester, boric acid mannitol ester, the mixed anhydride of boric acid and acetic acid or the mixed anhydride of boric acid and higher fatty acids as obtained, for example, from a fatty oil such as groundnut oil.

The amount of catalyst may vary widely, for example, between 0.1 and 10% by weight of the starting material. An amount of catalyst of from 2–6% by weight is in general preferred.

Acrylic acid, methacrylic acid, cinnamic acid, benzoylacrylic acid and crotonic acid are, for example, suitable as α,β-unsaturated monocarboxylic acids. The preferred α,β-ethylenically unsaturated monocarboxylic acids include acrylic acid and methacrylic acid.

Possible α,β-unsaturated polycarboxylic acids are products such as maleic acid, fumaric acid, citraconic acid, mesaconic acid, aconitic acid and/or their anhydrides, to the extent that the acids are able to form these. Maleic anhydride and fumaric acid are included among the preferred α,β-ethylenically unsaturated polycarboxylic acids.

Specific examples of the overall combination of unsaturated fatty acid condensation product with α,β-ethylenically unsaturated mono- or polycarboxylic acids or anhydrides are:

The reaction product of a fatty acid condenser which is obtained through condensation of a fatty acid mixture with the following combination:

|                     | Percent |
|---------------------|---------|
| Oleic acid          | 25–30   |
| Linoleic acid       | 65–75   |
| Saturated fatty acid| 5       | and which shows a viscosity of about 55 p. with maleic acid anhydride proportion by weight 4:1.

The reaction product of the above-mentioned fatty acid condenser with maleic acid anhydride proportion by weight 5:1.

The reaction product of a fatty acid condenser which is obtained through reaction of a fatty acid mixture of the following combination:

|                     | Percent |
|---------------------|---------|
| Saturated fatty acid| 8–10    |
| Oleic acid          | 5–20    |
| Linoleic acid       | 30–60   |
| Linolein acid       | 20–45   | and which shows a viscosity of about 60 p. with maleic acid anhydride proportion by weight 5:1.

The reaction product of a fatty acid condenser which is obtained through reaction of a fatty acid mixture of the following combination:

|                     | Percent |
|---------------------|---------|
| Oleic acid          | 50      |
| Linoleic acid       | 46      |
| Saturated fatty acid| 3       |
| Acid rosin          | 1       | and which shows a viscosity of about 35 p. with maleic acid anhydride proportion by weight 4:1.

The reaction product of a fatty acid condenser which is obtained through reaction of a fatty acid mixture of the following combination:

|                     | Percent |
|---------------------|---------|
| Saturated fatty acid| 10      |
| Linoleic acid       | 46–55   |
| Oleic acid          | 32–38   | and which shows a viscosity of about 40 p. with maleic acid anhydride proportion by weight 5:1.

The reaction products of the above-described fatty acid condensers with fumaric acid in the proportions by weight 4:1, 5:1, and 6:1 are also usable.

Instead of maleic acid anhydride in each case maleic acid can be used.

Alongside the α,β-unsaturated monocarboxylic and polycarboxylic acids it is further possible conjointly to use other vinyl and/or vinylidene compounds which do not carry any free carboxyl groups, but the total content of the sum of α,β-unsaturated carboxylic acids and vinyl and/or vinylidene compounds should not exceed 40% by weight of the end product.

Possible vinyl monomers are the esters of α,β-unsaturated monocarboxylic acids such as methyl acrylate, ethyl acrylate, propyl acrylate, butyl acrylate, octyl acrylate, 2-ethylhexyl acrylate, decyl acrylate, and lauryl acrylate, as well as the corresponding methacrylates, ethacrylates and phenylacrylates. Styrene, α-methylstyrene and vinyltoluene are furthermore suitable. Preferably, styrene, α-methylstyrene and vinyltoluene are employed, either alone or as mixtures.

Suitable vinylidene compounds are: vinylidene chloride and vinylidene fluoride.

Specific examples of the overall combination of the unsaturated fatty acid condensation product, the α,β-ethylenically unsaturated mono- or polycarboxylic acid or anhydride, and vinyl and/or vinylidene compounds are:
An overall combination which comprises 70% by weight of a fatty acid condensation product, which is obtained through condensation of a fatty acid mixture of the following combination in the presence of boron catalysts:

| | Percent |
|---|---|
| Oleic acid | 25–30 |
| Linoleic acid | 65–75 |
| Saturated fatty acids | 5 | and which comprises in copolymerized form:

| | Percent |
|---|---|
| Styrene | 24 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Saturated fatty acid | 8–10 |
| Oleic acid | 5–20 |
| Linoleic acid | 30–60 |
| Linolenic acid | 20–45 | and which comprises in copolymerized form:

| | Percent |
|---|---|
| Styrene | 24 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Oleic acid | 50 |
| Linoleic acid | 46 |
| Saturated fatty acid | 3 |
| Acid rosin | 1 | and which comprises in copolymerized form:

| | Percent |
|---|---|
| Styrene | 24 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Saturated fatty acid | 10 |
| Linoleic acid | 46–55 |
| Oleic acid | 32–38 | and which comprises in copolymerized form:

| | Percent |
|---|---|
| Styrene | 24 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Oleic acid | 25–30 |
| Linoleic acid | 65–75 |
| Saturated fatty acid | 5 | and which comprises in copolymerized form:

| | Percent |
|---|---|
| Acrylic acid butyl ester | 12 |
| Styrene | 12 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Saturated fatty acid | 8–10 |
| Oleic acid | 5–20 |
| Linoleic acid | 30–60 |
| Linolenic acid | 20–45 | and which comprises in copolymerized form:

| | Percent |
|---|---|
| Acrylic acid butyl ester | 12 |
| Styrene | 12 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Oleic acid | 50 |
| Linoleic acid | 46 |
| Saturated fatty acid | 3 |
| Acid rosin | 1 | and which comprises in copolymerized form:

| | Percent |
|---|---|
| Acrylic acid butyl ester | 12 |
| Styrene | 12 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Saturated fatty acid | 10 |
| Linoleic acid | 46–55 |
| Oleic acid | 32–38 | and which comprises in copolymerized form:

| | Percent |
|---|---|
| Acrylic acid | 12 |
| Styrene | 12 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Oleic acid | 25–30 |
| Linoleic acid | 65–75 |
| Saturated fatty acid | 5 | and which comprises in copolymerized form:

| | Percent |
|---|---|
| Ethyl methacrylate | 24 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Saturated fatty acid | 8–10 |
| Oleic acid | 5–20 |
| linoleic acid | 30–60 |
| Linolenic acid | 20–45 | and which comprises in copolymerised form:

| | Percent |
|---|---|
| Ethyl methacrylate | 24 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Oleic acid | 50 |
| Linoleic acid | 45 |
| Saturated fatty acid | 3 |
| Acid rosin | 1 | and which comprises in copolymerised form:

| | Percent |
|---|---|
| Ethyl methacrylate | 24 |
| Acrylic acid resp. 6% methacrylic acid | 6 |

An overall combination which comprises 70% by weight of a fatty acid condensation product, which is obtained through condensation of a fatty acid mixture of the following combination in the presence of boron catalysts:

| | Percent |
|---|---|
| Saturated fatty acid | 10 |
| Linoleic acid | 45–55 |
| Oleic acid | 32–38 | and which comprises in copolymerised form:

| | Percent |
|---|---|
| Ethyl methacrylate | 24 |
| Acrylic acid resp. 6% methacrylic acid | 6 |

The reaction of $\alpha,\beta$-unsaturated dicarboxylic acids with the fatty acid condensation products takes place by heating to temperatures of 180–240° C., at which the Diols-Alder reaction and the so-called substituting addition (Wagner and Sarx, supra) represent the main reactions.

The molar ratio of $\alpha,\beta$-unsaturated polycarboxylic acids to the unsaturated fatty acid condensation products may vary and also depends on the nature of the fatty acid used, with low viscosity products in general being formed when using fatty acids derived from semi-drying oils and high viscosity products being formed when using fatty acids derived from drying oils and particularly when using isomerized fatty acids. The preferred ratio of unsaturated dicarboxylic acid is between 1:0.15 and 1:0.4. The desired viscosity ranges of the end products are adjusted by selection and mixing of suitable unsaturated fatty acid condensation products. Furthermore, the viscosity of the end product is controled by the reaction temperature and by the degree of conversion of the $\alpha,\beta$-ethylenically unsaturated carboxylic acid with the fatty acid condensation products. The relative amounts of the reactants and the degree of conversion are adjusted so that the end products have acid numbers of 35 to 120, preferably 35 to 80.

The amount of the $\alpha,\beta$-ethylenically unsaturated carboxylic acids which do not enter into the reaction should, however, under no circumstances exceed 10% by weight of the amount of those employed.

A preferred reaction of the fatty acid condensation products with the $\alpha,\beta$-ethylenically unsaturated monocarboxylic acids and the vinyl and/or vinylidene compounds takes place with warming, preferably under the influence of polymerization catalysts such as di-tert. butyl peroxide, benzoyl peroxide and/or other peroxides. The reaction temperature in the polymerization depends on the catalyst system employed. Reaction temperatures of between 120 and 160° C. are preferred as the most advantageous ranges, and preferably using di-tertiary butyl peroxide, optionally combined with a chain stopper, preferably laurylmercaptan. At low reaction temperatures—say below 120° C.—the completely reacted reaction mixture is of too high a viscosity for easy processability and furthermore the reaction speed, which can be followed by the increase in the solids content, is for many monomers very slow under these conditions. At high reaction temperatures—say above 180° C.—products of lower viscosity are obtained even on purely thermal polymerization. The speed of reaction can be increased by cobalt++ salts, for example $CoCl_2$, in amounts of 3 to 6 parts by weight per million, relative to the monomer mixture.

The same accelerated reaction speeds are, however, also achieved by the presence of stainless steel material in the reaction mix.

Another preferred embodiment of the reaction consists of reacting the fatty acid condensation products with the $\alpha,\beta$-ethylenically unsaturated dicarboxylic acids or their anhydrides merely by heating, since end products of low viscosity are thereby obtainable in a particularly simple manner.

To the extent that the requirements made of the end product permit an increased viscosity, the reaction of the fatty acid condensation products with the $\alpha,\beta$-ethylenically unsaturated dicarboxylic acids in the presence of other vinyl and/or vinylidene compounds yields end products which are distinguished by better drying-on and by better water resistance of the dried coatings.

The viscosity of the end products varies very greatly depending on the selected reaction conditions. Particularly good results during use and film formation are achieved if the viscosity of the end products, measured at 50% strength in butyl glycol (ethylene glycol butyl ether) falls within the range B to Q (Gardner-Holdt viscometer).

The reaction products of the process of the invention are, after manufacture, neutralized with aqueous ammonia solution and/or strong organic nitrogen bases, such as for example triethylamine, diethylamine, trimethylamine, piperidine, morpholine and monoethylamine. Tertiary, secondary or primary alkylolamines, such as for example triethanolamine, diethanolamine, monoethanolamine, n-dimethylethanolamine, n-methylethanolamine, n-diethanolamine, monoisopropanolamine, diisopropanolamine, triisopropanolamine and polyglycolamines, preferably diglycolamine, are also suitable for the neutralization, used individually or as mixtures. By strong organic nitrogen bases there are understood those of which 0.05 normal aqueous solutions have a pH value of at least 10 measured at 25° C. Among the nitrogen bases mentioned, ammonia and triethylamine are particularly preferred since when using these the yellowing of the binders manufactured therefrom is markedly reduced.

It is not always necessary to use the amount of nitrogen bases theoretically required for the neutralization, and adequate dispersability in water or solubility in water is frequently already achieved with lesser quantities.

On addition of ammonia and/or amine aqueous solutions should preferably be produced which may appear either clear or cloudy. In general, it is advisable to add minor quantities of organic solvents which are extensively miscible with water, such as for example monoethers and diethers of diethylene glycol with lower monohydric alcohols, such as methanol, ethanol, propanol or butanol, usch as for example methylglycol, ethylglycol, propylglycol, isopropylglycol, butylglycol, diethylene glycol or diethyl ether, and furthermore diacetone-alcohol and lower ketones such as acetone or methyl ethyl ketone in order to achieve adequate ability to be diluted with water.

The film formation of the air drying synthetic resins capable of dilution with water can, when used in aqueous binders, be accelerated by the addition of known catalysts, so-called driers.

The invention also relates to the use of the synthetic resin products manufactured according to the invention in air drying lacquers capable of dilution with water, either as sole binders or in combination with other water-soluble air drying products.

These lacquers may be unpigmented or pigmented and can, for example be applied to iron or steel or nonferrous metal with or without pre-treatment such as passivation, phosphatization, electrochemical galvanization, tin-plating or other metallizations. Timber and timber products and concrete are also possible substrates. Pigments and/or fillers are, for example, without thereby restricting the invention, red iron oxide, carbon black, lead silicochromate, strontium chromate, blanc fix, micronized varieties of barytes, microtalc, colloidal chalk, diatomaceous earth, china clay and others.

As regards the use of suitable types of titanium oxide, attention is drawn to S. Holzinger, supra. As regards the selection of color pigments, see the article by Ott and Dreher, supra. The use of strongly basic pigments such as zinc oxide, zinc chromate, lead carbonate, basic lead sulphate, litharge, calcium plumbate in the lacquer must be precisely tested in each individual case. The ratio of the pigment to the binder depends on the pigment type employed and on the coating materials used. In general, a ratio of 0.6:1 to 2:1 is preferred.

The hydrophylic salts of the air drying synthetic resins obtained in accordance with the present invention may be used in surface coating compositions with advantage in association with the synthetic resins described in copending U.S. application Ser. No. 728,920 (now abandoned). The synthetic resins described in the copending patent application should be used in the form of their salts with ammonia or other strong nitrogen base.

As described in the copending application, these synthetic resins are obtained by heating at least one phenolic resin with at least one ethylenically unsaturated fatty acid having at least 14 carbon atoms, or with an ester of such a fatty acid, the product being saponified to remove ester groupings where necessary.

The product obtained by reacting the phenolic resin with the fatty acid or ester may be reacted with a compound containing an oxyrane ring such as ethylene oxide or propylene oxide. The synthetic resins obtained by reaction of the phenolic resin and the fatty acid or ester may be further modified by copolymerization with a vinyl or vinylidene compound. Alternatively, or additionally, the resins may be modified by reaction with cyclopentadiene or dicyclopentadiene. Instead of modifying the synthetic resin obtained by reaction of the phenolic resin with the fatty acid or ester by copolymerizing the synthetic resin with the vinyl or vinylidene compound or with cyclophentadiene or dicyclopentadiene, the unsaturated fatty acid or ester may be copolymerized initially with vinyl or vinylidene compounds, or with the cyclopentadiene or dicyclopentadiene. The modified fatty acid or ester is then reacted with a phenolic resin. As a final step the synthetic resin may be reacted with an $\alpha,\beta$-ethylenically unsaturated dicarboxylic acid or anhydride.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

110 g. of a fatty acid mixture consisting of 25 to 30% by weight of oleic acid, 65 to 70% by weight of linoleic acid and 5% by weight of saturated fatty acids and 2.75 g. of crystalline boric acid are introduced into a 250 cc. flask on which a fractionating column was mounted vertically. This column was connected to a vacuum pump via an air condenser and a receiver. The fractionated column was filled with packings of stainless steel spirals or glass Raschig rings. After evacuating the equipment to about 2–3 mm. mercury column, the flask was slowly heated by means of a metal bath until the bath temperature was 290° C. The bath temperature was brought to 210° C. over the course of 60 minutes. Then the bath temperature was raised from 210 to 290° C. over the course of 150 minutes. The bath was kept for a further 3 hours at the latter temperature. The fractionating column was heated to 175° C. by means of an electric resistance heater. Material began to distill over into the receiver from about 210° C. bath temperature onwards. The condensation of the material entering the fractionating column began at a lower bath temperature. After having been heated to 290° C. for 3 hours, the reaction mixture was cooled. The boric acid contained therein was filtered off while the residue was still warm. The reaction product (=starting condensation product) has a viscosity of 60 cp. measured 1:1 in butylglycol at 20° C., an acid number of 5.5 and a refractive index of 1.500 at 20° C.

100 g. of this reaction product (=starting condensation product) are heated to 150° C. 20 g. of maleic anhydride are added thereto. The mixture is heated to 180–200° C. and kept at this temperature until the content of free maleic anhydride has fallen to below 1%. 6 g. of water are then added and the mixture is heated to 100° C. for 2 hours. The product has an acid number of 87 and a viscosity of 1300 cp. measured at 20° C., 1:1 butylglycol. It is diluted to a solids content of 50% with butylglycol and sufficient aqueous concentrated ammonia solution is added for the product to be easily capable of dilution with water. It is then diluted with water to 40%. A film of 90$\mu$ coating thickness containing 0.1% of drier (cobalt drier Cyclodex) applied to a glass plate is dust-dry within 2 hours.

EXAMPLE 2

100 g. of the fatty acid condensation product (=starting condensation product) described in Example 1 are heated to 150° C. A mixture consisting of 8 g. of acrylic acid, 16 g. of vinyltoluene and 1 g. of di-tert.-butyl peroxide is added dropwise thereto over the course of 2.5 hours. The mixture is kept at 150° C. until the solids content (1 hour 110° C.) is about 98%. The remainder of the monomer is then removed by vacuum distillation. The reaction product has an acid number of 44 and has a viscosity of 380 cp. measured 1:1 in butylglycol at 20° C. It is diluted to a solids content of 50% with butyl glycol and mixed with a sufficient amount of concentrated aqueous ammonia solution to make it easily dispersible in water. It is then diluted to a solids content of 40% with water. A film applied at 90$\mu$ and containing 0.1% of cobalt drier (Cyclodex) is dust-dry in 2 hours. The film is very stable to water.

EXAMPLE 3

The resin obtained according to Example 2, having a solids content of 40%, is ground in a ceramic ball mill with titanium dioxide pigment (Bayer RN 57) in such a way that the pigment-binder ratio is 1:1. A highly glossy film applied at 90$\mu$ from a sample containing 0.1% of cobalt drier is dust-dry after about 3 hours.

The water-soluble synthetic resins according to the invention can also be used as binders for lacquers capable of electrophoretic deposition. The products most suitable for this end use are those of which the viscosities lie within the range of E–Q measured 1:1 in butylglycol at 20° C. according to Gardner-Holdt.

When the synthetic resins as in this invention are used for electrophoretic coating, the resins being obtained by reaction of fatty acid condensation products with $\alpha,\beta$-ethylenically unsaturated dicarboxylic acids such as maleic acid respectively maleic acid anhydride or fumaric acid generally exhibiting acid numbers of 100–160, one obtains surprisingly excellent corrosion resistance after stoving (30 minutes at 170° C.) when the separation is carried out on steel plates which have been zinc phosphatized beforehand. However, the corrosion protection obtained on untreated iron sheets or phosphatized iron sheets is not satisfactory in this particular case. Good corrosion protection is obtained also on these metal bases, when the products of this invention are used, which show acid numbers between 30 and 50, and where the fatty acid condensation products have been reacted with $\alpha,\beta$-ethylenically unsaturated monocarboxylic acids in a mixture with other vinyl or vinylidene compounds. In this case it is also preferred to add a hardenable phenol resin or aminoplast to the resin of this invention for electrophoretic separation. By hardenable phenol resin, a resin is to be understood, which comes into being through reaction of a phenol compound respectively in alkyl substituted phenol compound with formaldehyde with a molar proportion of 1:1.5 to 1:2.5 The phenol used can be cresol, resorcinol, catechinol and phenol itself. Preferred phenol is alkyl phenol as well as amil phenol, p.tert.-butyl phenol. However, polynuclear phenol compounds can also be used, for example 4,4'-dioxydiphenyl propane. Under aminoplasts are generally understood melamine formaldehyde condensation products with a mole proportion of 1:4 to 1:6, which are preferably etherified partly or completely with lower aliphatic alcohols with 1 to 4 carbon atoms.

EXAMPLE 4

10 kg. of a 40% strength solution of the resin according to Example 2 are ground with 2 kg. of red iron oxide in a ball mill and diluted with distilled water to a solids content of 10%. This 10% strength solution is run into an electrophoresis test basin of 2 liter capacity. Degreased steel sheets, each having an area of 150 cm.$^2$, are used as the cathode and anode. On applying a direct voltage of about 100 volts the steel sheet at the anode is uniformly coated with the lacquer. The coated sheet is rinsed with water and stored for 30 minutes at 170° C. A hard elastic coating is obtained.

Manufacture of phenolic Resin 1

1.5 formaldehyde are added in a known manner to p-tert.-butylpheol in an aqueous alkaline medium, and during the course thereof the temperature should not exceed 70° C. The resulting p-tert.-butylphenolresol is decomposed with sulfuric acid and excess acid and salt present are removed by repeated washing with water. Thereafter the water is distilled off over the course of as short a time as possible, and this can under certain circumstances be carried out in vacuo. The resin is kept at 115–120° C. for the purpose of further reaction until a resin sample, when drawn and cooled, possesses a melting point of 50–60° C.

Manufacture of an air drying water-soluble phenolic resin 33 parts of phenolic resin 1 and 66 parts of wood oil are reacted at 200–210° C. until the viscosity has risen to 600–650 cp./20° C. The reaction takes place under inert gas. Thereafter the mix is cooled and reacted with 5 parts of propylene oxide at 100° C. The mix is kept at 100 to 120° C. under reflux for about 2 hours. After completion of the reaction the excess propylene oxide is removed by vacuum distillation. The viscosity of the resulting reaction product is about 750 cp./20° C.; the saponification number is about 115.

The reaction product is saponified using an excess of about 10–20% alcoholic potassium hydroxide. The saponification takes place by heating under reflux and under reflux and under a nitrogen atmosphere. The saponification is complete after about 3 hours reflux boiling. The mix is neutralized with dilute hydrochloric acid (1 part of hydrochloric acid and 1 part of water) until the resin precipitates from the solution. The water of decomposition is separated off, after which the resin solution which remains is washed three times with water. The resin obtained after the third washing is freed of water by azeotropic distillation with xylene. As soon as no further water accumulates in the water separator, the traces of water still remaining in the resin and the xylene are removed by vacuum distillation during which the temperature may rise to 160° C. Potassium chloride precipitates from the anhydrous resin and is separated off by filtration. The viscosity is 180–250 cp./20° C., measured at 66% strength in white spirit.

677 parts of this dehydrated resin are mixed at 150° C., over the course of 2½ hours, with a mixture consisting of:

| | Parts |
|---|---|
| Styrene | 142 |
| α(-methylstyrene | 385 |
| Acrylic acid | 46 |
| and | |
| Di-tert.-butyl peroxide | 20 |

Thereafter the temperature is kept at between 150 and 160° C. until a solids content of 83% by weight has been reached (test: 1 g. of resin is weighed out into a sheet metal dish of diameter 8.5 cm., diluted with 2 ml. of ethanol and dried for 1 hour in a drying cabinet at 110° C.). The excess monomer is diluted off in vacuo. The viscosity is about 250 to 280 cp./20° C., measured 1:1 in butylglycol. This resin is diluted to 50% by weight solids content with ethylglycol, completely neutralized (relative to the acid number of 81.5) with concentrated ammonia solution and thereafter diluted with water to 40% by weight solids content. The solution has cobalt dried (Cyclodex), 0.1% of cobalt relative to the solids resin, incorporated into it.

EXAMPLE 5

60 parts of an air drying water-soluble phenolic resin, of which the manufacture has been described above, and 40 parts of the synthetic resin which has been obtained according to Example 2, are mixed with one another as a 40% strength solution. This mixture is ground in a ceramic ball mill with titanium dioxide pigment (Bayer RN 57) in such a way that the pigment-binder ratio is 1:1. A highly glossy film applied at 90µ from a sample containing 0.1% of cobalt drier is dust-dry after about 3 hours. The film is distinguished by very good resistance to corrosion.

EXAMPLE 6

Preparation of an unsaponifiable adduct of a fatty acid condensation product with maleic anhydride 110 grams of a fatty acid mixture which consisted of 50% by weight of oleic acid, 46% by weight of linoleic acid, 3% by weight of saturated fatty acids and 1% by weight of resin acid were added together with 2.75 grams of crystalline boric acid to a 250 cc. flask to which a vertical fractionating column was attached. This column was coupled to a vacuum pump via an air condenser and a receiver. The fractionating column was packed with stainless steel spirals or glass Raschig rings. After evacuating the apparatus to approximately 2 to 3 millimeters of mercury the flask was heated slowly by means of a metal bath until the bath temperature reached 290° C. The bath temperature was first brought to 210° C. over a period of 60 minutes. The bath temperature was then raised from 210° C. to 290° C. over 150 minutes. The bath was held for a further three hours at the latter temperature. The fractionating column was heated by means of an electrical resistance heater to 175° C. Material began to distill over into the receiving vessel from about 210° C. bath temperature onwards. Condensation of material entering the fractionating column began at a lower bath temperaure. After being heated for 3 hours at a temperature of 290° C., the reaction mixture was cooled. The boric acid contained in the reaction mixture was filtered off while the residue was still warm. The reaction product (i.e. the starting condensation product) has a viscosity of 60 cp., an acid number of 5.5 and a refractive index of 1.500 at 20° C.

100 grams of this reaction product (i.e. the starting condensation product) were heated to 150° C. 25 grams of maleic anhydride were added thereto. The mixture was heated to 180 to 200° C. and held at this temperature until the content of free maleic anhydride had fallen below 1%. 6 grams of water were then added and the mixture was heated for 2 hours at 100° C. The product had an acid number of 132 and a viscosity of 260 cp., measured at 20° C., 1:1 in butylglycol. It was diluted with isopropyl glycol to a solids content of 70% by weight and sufficient triethylene amine was added to enable the product to be easily diluted with water.

EXAMPLE 7

Preparation of an unsaponifiable adduct of a fatty acid condensation product with maleic anhydride The same method as in Example 6 is used, however, the condensation of fatty acid is broken off at an acid number of about 40. The non-reacted fatty acid is then removed by vacuum distillation until the product reaches an acid number of 7 and a saponification number of 16. The reaction product (starting condensation product) is then reacted with maleic anhydride as described in Example 6. The adduct has a viscosity of 200 cp. measured at 20° C. 1:1 in butylglycol and has an acid number of 140. It is diluted with isopropylglycol to a solids content of 70% and neutralized with diisopropanolamine. It is unlimitedly dilutable in water.

EXAMPLE 8

The same starting condensation product as in Example 7 is prepared. To 140 g. of this starting condensation product is dropwise added within a time of 2 hours at 150° C., a mixture of 12 g. acrylic acid, 48 g. styrene, 3 g. di-tert,-butyl peroxide and 3 g. laurylmercaptan. The reaction is held at 150° C. until the solids content has reached 98%. Non-reacted monomers are then removed by vacuum distillation. The product has a viscosity of 350 cp. measured 1:1 in butylglycol at 20° C. and has an acid number of 52. It is diluted with butylglycol to a solids content of 70% and after neutralization with triethylamine is dilutable with water without limitation.

EXAMPLE 9

The same method is used as in Example 1. However, instead of the fatty acid mixture described therein, a fatty acid is used which is obtained by saponification with fish oil and which shows an iodine number of at least 195. The condensation is carried out long enough until the acid number has decreased to 35. The remaining non-reacted fatty acid is removed by vacuum distillation so that the product shows an acid number of about 5. The saponification number of the product amounts to 17, the viscosity to 300 cp. measured 2:1 in xylol (xylene) at 20° C. 100 g. of this reaction product (starting condesation product) are heated to 150° C. and then 25 g. maleic anhydride are added. The mixture is heated to 180 to 200° C. and is held at this temperature until the content of free maleic anhydride has fallen to below 1%. The anhydride groups are then decomposed by reaction with 6 g. water at 100° C. within 2 hours. The product shows a viscosity of 440 cp. measured at 1:1 in butylglycol at 20° C. and an acid number of 138. After dilution with isopropylglycol to 70% and neutralization with triethylamine, the produce is dilutable with water without limitation.

The specific examples of the combination of the hydrophylic salts of air drying synthetic resins of the present invention with the synthetic resins described in copending application Ser. No. 728,920 are:

EXAMPLE 10

A mixture of the product obtained in Example 1 of the present invention with the product produced as described in Example 3 of the application Ser. No. 728,920 (reaction product of a p-tert.-butyl phenolic resin with Tungoil, styrene, α-methylstyrene and acrylic acid) in the mixture proportion 6:4 to 7:3.

EXAMPLE 11

A mixture of the resin obtained in Example 9 of the present invention with a resin produced as described in Example 5 of the application Ser. No. 728,920 (reaction product of a p-tert.-butyl phenolic resin with a linseed oil/tung oil mixture and lastly reaction with styrene, α-methylstyrene and acrylic acid) in the mixture proportion 8:2 to 6:4.

EXAMPLE 12

A mixture of the resin obtained in Example 2 of the present invention with a resin produced as described in Example 8 of the application Ser. No. 728,920 (reaction product of a p-tert.-butyl phenolic resin with linseed oil, fatty acid methyl ester and tung oil fatty acid methyl ester and lastly reaction with styrene, α-methylstyrene and acrylic acid) in the mixture proportion 7:3 to 4:6.

EXAMPLE 13

A resin produced as described in Example 2 of the present invention is mixed with a p-tert.-butyl phenolic resol which is etherified with butanol in the proportion 8:2. The mixture is precondensed for one hour at 120° C. and then diluted with butyl glycol to a solids content of 70%. After neutralization with triethylamine the resin is diluted with water to a solids content of 40% and ground with titanium dioxide in a ceramic ball mill so that the pigment proportion is 1:1. The pigment paste is then diluted with water to a solids content of 10% and filled into a 2 liter size electrophoretic experiment vessel. Degreased steel sheets are used as cathode and anode, each having a surface of 150 cm.$^2$. On applying a direct current of about 100 volts, the steel sheet in the anode is unformly covered with lacquer. The sheet is rinsed with water. After stoving (30 minutes at 170° C.) a very good corrosion resistant coating is obtained.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and conditions. Consequently, such changes and modifications are properly, equitably, and intended to be, within the full range of equivalence of the following claims.

We claim:
1. In the process of preparing condensation products by:
   (a) heating an acid of the formula R.CO.OH where R is an unsubstituted long chain hydrocarbon radical, at a temperature of 220 to 330° C. in the presence of a catalyst selected from the group consisting of boric acid, boric oxide, ammonium pentaborate, trimethyl borate, triethyl borate, mannitol borate and the mixed anhydrides of boric acid and fatty acid, until the reaction mixture contains at least 32% by weight of unsaponifiable matter having a means molecular weight at least three times of said acid, the heating being carried out under such conditions that water liberated during the reaction is removed from the reaction zone as it is formed but the loss of the major part of the acid is avoided, to prepare condensation products, the improvement comprising:
   (b) reacting said condensation products with α,β-ethylenically unsaturated compounds selected from the group consisting of α,β-unsaturated carboxylic acids having 3–6 carbon atoms, anhydrides of said acids or mixtures thereof, wherein the weight ratio of said condensation products to said α,β-ethylenically unsaturated compounds is between 1:0.15 and 1:0.4, and forming a reaction product having an acid number of at least 35; and
   (c) neutralizing said reaction product with a strong base selected from the group consisting of ammonia, organic primary, secondary, tertiary and heterocyclic amines or mixtures thereof, at a temperature below

50° C., said strong organic nitrogen bases having a pH equal to or greater than 10.0 in 0.05 normal aqueous solution measured at 25° C.

2. The process of claim 1, further comprising adding vinyl compounds to step (b) selected from the group consisting of esters of $\alpha,\beta$-unsaturated monocarboxylic acids having 4 to 15 carbon atoms, styrene, $\alpha$-methylstyrene, vinyltoluene, vinylidene chloride and vinylidene fluoride wherein said vinyl compounds comprise up to 40 percent by weight of the end product.

3. The process of claim 1, wherein said neutralized product has a viscosity of about B to Q measured in the Gardner-Holdt viscometer at 50 percent strength in ethylene glycol monobutyl ether.

4. The product obtained by the process of claim 1.

References Cited

UNITED STATES PATENTS

| | | | |
|---|---|---|---|
| 1,982,831 | 12/1934 | Röhm et al. | 260—23 |
| 2,623,891 | 12/1952 | Hormann | 260—407 |
| 2,839,550 | 6/1958 | Wiggerink et al. | 260—18 |
| 2,923,718 | 2/1960 | Mikusch-Buchberg | 260—407 |
| 3,030,321 | 4/1962 | Lombardi et al. | 260—23 |
| 3,251,790 | 5/1966 | Christenson | 260—23 |

HOSEA E. TAYLOR, Primary Examiner

W. E. PARKER, Assistant Examiner

U.S. Cl. X.R.

117—161; 260—23, 407